United States Patent
Li et al.

(10) Patent No.: US 10,863,315 B2
(45) Date of Patent: Dec. 8, 2020

(54) DYNAMIC ALLOCATION AND DE-ALLOCATION OF MSISDN TO VEHICLES

(71) Applicant: Telefonaktiebolaget LM Ericsson (publ), Stockholm (SE)

(72) Inventors: Qiang Li, Täby (SE); Rafia Inam, Västerås (SE); Aneta Vulgarakis Feljan, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/307,921

(22) PCT Filed: Jun. 7, 2016

(86) PCT No.: PCT/EP2016/062883
§ 371 (c)(1),
(2) Date: Dec. 6, 2018

(87) PCT Pub. No.: WO2017/211391
PCT Pub. Date: Dec. 14, 2017

(65) Prior Publication Data
US 2019/0200170 A1 Jun. 27, 2019

(51) Int. Cl.
*H04W 4/029* (2018.01)
*H04W 8/26* (2009.01)
*H04W 4/90* (2018.01)
*H04W 4/02* (2018.01)

(52) U.S. Cl.
CPC ........... *H04W 4/029* (2018.02); *H04W 4/026* (2013.01); *H04W 4/90* (2018.02); *H04W 8/265* (2013.01)

(58) Field of Classification Search
CPC ....... H04W 4/029; H04W 4/90; H04W 4/026; H04W 8/265
See application file for complete search history.

(56) References Cited

U.S. PATENT DOCUMENTS

| | | | |
|---|---|---|---|
| 8,781,442 B1 * | 7/2014 | Link, II | G08G 1/205 455/411 |
| 2005/0222752 A1 * | 10/2005 | Sokola | H04W 4/029 701/532 |
| 2010/0273462 A1 * | 10/2010 | Thorn | H04W 8/26 455/414.1 |
| 2011/0039559 A1 * | 2/2011 | Yi | H04W 48/18 455/435.2 |

(Continued)

FOREIGN PATENT DOCUMENTS

| | | |
|---|---|---|
| GB | 2 371 946 A | 8/2002 |
| GB | 2 439 768 A | 1/2008 |

OTHER PUBLICATIONS

International Search Report and Written Opinion dated Oct. 17, 2016 issued in International Application No. PCT/EP2016/062883. (11 pages).

(Continued)

*Primary Examiner* — Michael J Moore, Jr.
(74) *Attorney, Agent, or Firm* — Rothwell, Figg, Ernst & Manbeck, P.C.

(57) ABSTRACT

Methods and devices enable communication via a wireless network with moving vehicles, depending on the likelihood or presence of an emergency situation. The communication may be enabled also when an Internet connection is present.

16 Claims, 10 Drawing Sheets

(56) References Cited

U.S. PATENT DOCUMENTS

| | | | |
|---|---|---|---|
| 2011/0215949 A1* | 9/2011 | Yarnold | G08G 1/205 340/989 |
| 2012/0108198 A1 | 5/2012 | Edge et al. | |
| 2012/0289181 A1 | 11/2012 | Bourdu et al. | |
| 2013/0023228 A1* | 1/2013 | Watson | H04W 4/90 455/404.1 |
| 2013/0279458 A1 | 10/2013 | Farkas et al. | |
| 2015/0213555 A1 | 7/2015 | Barfield, Jr. et al. | |
| 2015/0288636 A1* | 10/2015 | Yalavarty | H04L 51/16 709/206 |
| 2016/0029197 A1* | 1/2016 | Gellens | H04Q 9/00 455/404.1 |
| 2016/0105784 A1* | 4/2016 | Gellens | H04W 8/205 455/404.1 |
| 2017/0374538 A1* | 12/2017 | Gellens | H04W 4/90 |
| 2019/0028869 A1* | 1/2019 | Kaliner | H04W 8/26 |

OTHER PUBLICATIONS

Schettino, M. et al., "Pan-European eCall Implementation Guidelines", European eCall Implementation Platform, Draft v3.0 (Feb. 3, 2012). (27 pages).

* cited by examiner

US 10,863,315 B2

DYNAMIC ALLOCATION AND DE-ALLOCATION OF MSISDN TO VEHICLES

CROSS REFERENCE TO RELATED APPLICATION(S)

This application is a 35 U.S.C. § 371 National Stage of International Patent Application No. PCT/EP2016/062883, filed Jun. 7, 2016, designating the United States.

TECHNICAL FIELD

Embodiments of the subject matter disclosed herein generally relate to methods and devices for dynamic allocation and de-allocation of a Mobile Station International Subscriber Directory Number, MSISDN, in a wireless communication network.

BACKGROUND

Some vehicle manufacturers (such as General Motors, GM) have for many years offered vehicles equipped with wireless devices enabling subscription-based communications, in-vehicle security, hands-free calling, turn-by-turn navigation, and/or remote diagnostics systems, using a Subscriber Identity Module, SIM, card. For example, GM's OnStar services are operable throughout the United States, Canada, China, Mexico, Europe, Brazil and Argentina. In Europe, there is an ongoing collaborative effort to standardize a system for an in-vehicle emergency service/call, eCall. ECall aims to provide rapid help/support in the event of road accidents.

As illustrated in FIG. 1, in a serious accident, a vehicle 110 having eCall service automatically initiates a 112 call (112 is the European emergency assistance number, equivalent to 911 in the U.S.) to a suitable Public Safety Answering Point, PSAP, 120. Such a call may also be triggered manually using a special button. The eCall system (1) automatically recognizes an accident (e.g., using the vehicle's sensors), (2) locates the vehicle's current position (e.g., GPS 130 may be used), and (3) informs emergency services (e.g., via a GSM network 140).

After a connection is established, the vehicle first transmits a Minimum Set of Data (MSD) that includes the vehicle's location, time and direction. A voice contact is then established between the PSAP and the vehicle; that is, the voice call is un-muted. Wireless devices necessary for eCalls are now provided in all new vehicles or installed in older ones. ECall-related communication must be reliable (e.g., acknowledged) and fast (e.g., initiation should take no longer than 14-17 s).

In order to support all vehicles with eCall service, each vehicle requires a unique Mobile Station International Subscriber Directory Number (MSISDN) to establish the call. A large number of MSISDN numbers are necessary to provide an MSISDN for each vehicle. Numerous MSISDNs are already used for every mobile phone. On one hand, an MSISDN has to be assigned to a vehicle in order to enable establishing an eCall. On the other hand, this MSISDN number is only used if an accident occurs. The ratio of the number of accidents per number of vehicles is minuscule, which means most vehicle MSISDNs are seldom, if ever, used. Additionally, a small fee is associated with use of an MSISDN which, when aggregated, results in big costs. MSISDN availability is a very limited and costly resource. Notable, a Subscriber Identity Module (SIM) card is not necessary to make an eCall.

It is desirable to find solutions leading to more efficient use of MSISDNs in the context of enabling emergency calls such as eCalls.

SUMMARY

In order to use available MSISDNs efficiently, various embodiments provide MSISDNs to vehicles temporarily, taking into consideration the likelihood of an accident, as opposed to conventional permanent MSISDN allocation.

According to an embodiment, there is a method for dynamically allocating/de-allocating an MSISDN, in a wireless communication network. The method includes obtaining an international mobile subscriber identity, IMSI, and data related to a moving vehicle to which no MSISDN is allocated. The method further includes predicting an accident likelihood for the moving vehicle, and causing an MSISDN to be allocated to the moving vehicle, if the accident likelihood exceeds a first predetermined threshold.

According to another embodiment there is a network device configured to selectively enable allocating/de-allocating of an MSISDN to/from a vehicle. The network device comprises a communication interface and a processing unit connected to the communication interface. The processing unit is configured to control the communication interface to obtain an international mobile subscriber identity, IMSI, and data related to a moving vehicle to which no MSISDN is allocated, to predict an accident likelihood for the moving vehicle, and to control the communication interface to send first messages causing an MSISDN to be allocated to the moving vehicle, if the accident likelihood exceeds a first predetermined threshold.

According to another embodiment, there is a method performed by an emergency assistance network device for providing an MSISDN to a vehicle in an accident. The method includes receiving an eCall indicating that a vehicle that has no MSISDN has had an accident, triggering allocation of an MSISDN to the vehicle and calling the vehicle using the MSISDN.

According to yet another embodiment, there is an emergency assistance network device configured to handle eCalls. The device has a communication interface configured to receive an eCall indicating that a vehicle that has no MSISDN has had an accident, and a processing unit connected to the communication interface and configured to control the communication interface to send first messages triggering allocation of an MSISDN to the vehicle in a wireless communication network, and to initiate a call to the vehicle using the MSISDN.

According to another embodiment, there is a method for enabling communication with a vehicle connected to Internet. The method includes receiving a request to allocate an international mobile subscriber identity, IMSI, to the vehicle, the request including an unique vehicle identifier, allocating a temporary IMSI to the vehicle in association with the unique identifier, prompting a pool of available MSISDNs to indicate an MSISDN, and storing a link between the temporary IMSI and the MSISDN in a network database.

According to yet another embodiment there is a network device for enabling a vehicle connected to Internet to make an eCall. The network device has a communication interface and a processing unit connected to the communication interface. The communication interface is configured to receive a request to allocate an IMSI to the vehicle, the request including a unique vehicle identifier. The processing unit is configured to control the communication interface to send messages triggering a temporary IMSI be allocated to the vehicle, based on the unique identifier, an available MSISDN be indicated by an MSISDN pool, and a link between the temporary IMSI and the MSISDN be stored in a network database.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments are described in the context of an eCall and an LTE (i.e., Long Term Evolution, which is a currently used 4G communication standard) network. However, this context is merely exemplary and not intended to be limiting. In other words, the inventive concepts set forth in this section are operable for emergency calls that do not fit all eCall characteristics, and communication networks other than LTE.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In various embodiments, an MSISDN is allocated dynamically to a vehicle when the vehicle's accident likelihood is higher than a predetermined threshold, and de-allocated when this accident likelihood decreases. A stationary vehicle is unlikely to get into an accident that would trigger an emergency call. A vehicle speeding, in difficult weather conditions, or in traffic congestion is more likely than not to be involved in an accident. However, shortly after an accident or when the vehicle is parked, it is again unlikely to need to make an eCall.

Figure 1:
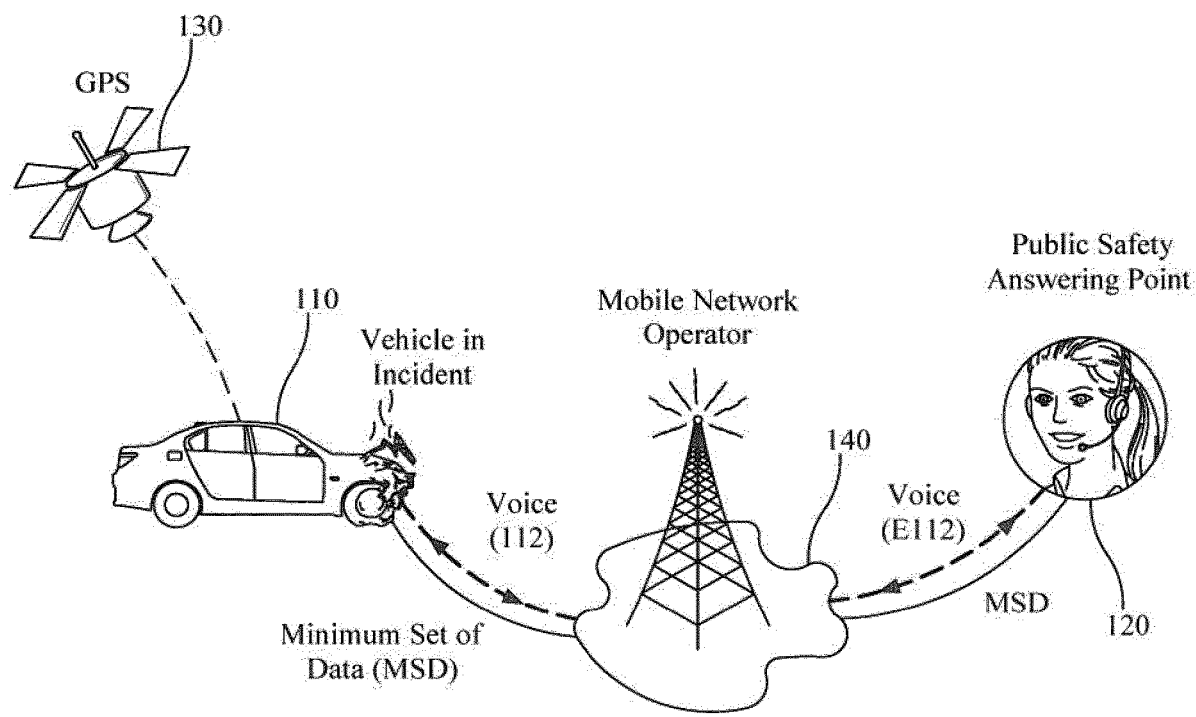
FIG. 1 is a diagram illustrating an eCall.
Figure 2:
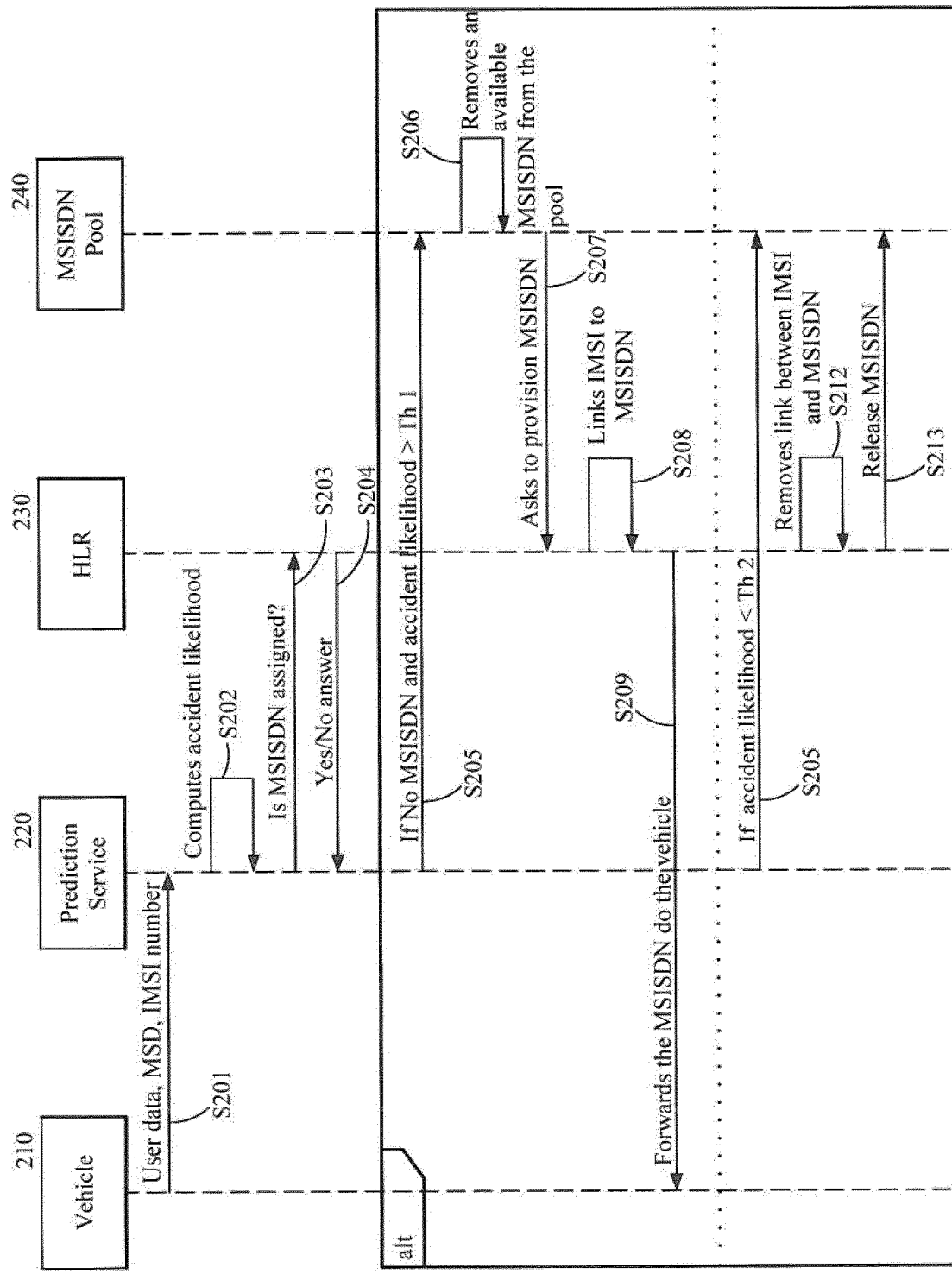
FIG. 2 illustrates communications in an LTE network for allocation and de-allocation of an MSISDN to/from a vehicle according to an embodiment.

FIG. 2 illustrates communications in an LTE network for prediction-based allocation and de-allocation of an MSISDN to/from a vehicle according to an embodiment. A vehicle 210 sends user data (e.g., the MSD) and its international mobile subscriber identity, IMSI, at S201. A network device 220, which obtains the user data and IMSI and computes accident likelihood for the vehicle, performs this computation at S202. Accident likelihood may be predicted based on the driver's behavior, traffic and road conditions (the latter being inferred from information available in the network and the vehicle's position).

Then network device 220 inquires whether an MSISDN has already been assigned to the vehicle. For example, the vehicle may have a permanent service subscription that includes an MSISDN. Specifically, the network device asks the Home Location Register, HLR, 230 if the vehicle's IMSI is linked to an MSISDN at S203 and receives an answer from HLR 230 at S204. HLR is included in the Home Subscriber Server, HSS, in an LTE network. However, in a more general perspective, HLR is a network database storing information, such as, links between MSISDNs and IMISs, respectively.

If the vehicle's accident likelihood exceeds a predetermined threshold Th1 and vehicle 210 does not have an MSISDN, then network device 220 causes an MSISDN to be allocated to the vehicle (steps S205-S208 in FIG. 2). At S205, network device 220 sends a message to an MSISDN pool 240 located in the network, asking it to indicate an MSISDN. MSISDN pool 240 may or may not be hosted by a different network device than HLR and the network device configured to provide the prediction service. It should be understood that, in a cloud environment, functions are not hosted necessarily in different device or in a single device, but they are generally distributed, with their execution coordinated in the cloud. Multiple instances of a function may also operate in parallel.

MSISDN pool 240 removes an available MSISDN from the pool at S206 and sends this MSISDN to the Home Location Register, HLR, 230, at S207, asking to have the MSISDN provided to the vehicle. HLR 230 links the vehicle's IMSI and the received MSISDN at S208, and then forwards the MSISDN to vehicle 210, at S209.

If later, network device 220 determines that the vehicle's accident likelihood has decreased below a threshold Th2 (which is the same or different than threshold Th1) at S211, then network device 220 initiates de-allocation of the MSISDN. On this purpose, in FIG. 2, network device 220 sends a de-allocation message to HLR 230 at S212, HLR 230 removes the link between the vehicle's IMSI and the MSISDN, and sends the MSISDN to MSISDN pool 240 at S213.

Figure 3:
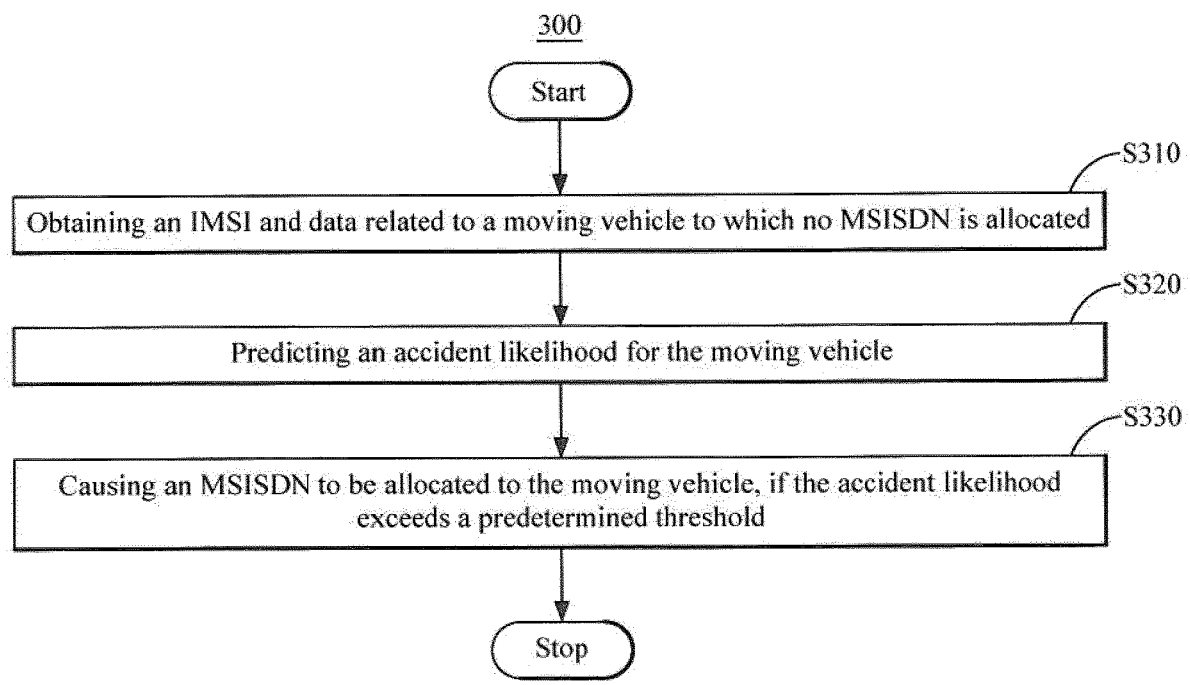
FIG. 3 is a flowchart of a method for allocating an MSISDN according to an embodiment.

FIG. 3 is a flowchart of a method 300 for dynamically allocating/de-allocating an MSISDN in a wireless communication network. Method 300 includes obtaining an international mobile subscriber identity, IMSI, and data related to a moving vehicle to which no MSISDN is allocated, at S310. Here the term "obtaining" indicates that direct communication between vehicle and the network device providing the prediction service is not required, the method being operable in the cloud and potentially employing plural other device(s).

Method 300 then includes predicting accident likelihood for the vehicle without an MSISDN allocated at S320, causing an MSISDN to be allocated to the moving vehicle if accident likelihood exceeds a first predetermined threshold at S330. Here again, the term "causing" indicates that no direct communication is required in the cloud environment. As in the embodiment illustrated in FIG. 2, causing the MSISDN to be allocated may include prompting a pool of available MSISDNs to indicate the MSISDN, and a link between the IMSI and the MSISDN to be stored in a network database (which may be HLR in LTE). Method 300 may further include conveying the MSISDN to the moving vehicle.

In one embodiment, an MSISDN may be allocated to a group of vehicles (i.e., multiple vehicles). The network device providing the prediction service may group vehicles based on their driving locations and timings (preferably selected so as to minimize the chance the grouped vehicles would need to make an eCall at the same time or at a very short time interval from one another). In this embodiment, the IMSIs of the grouped vehicles are linked to the same MSISDN, the link being stored in HLR. If one of the grouped vehicles makes an eCall, then other MSISDN(s) is/are allocated to the other vehicle(s) in the group.

Figure 4:
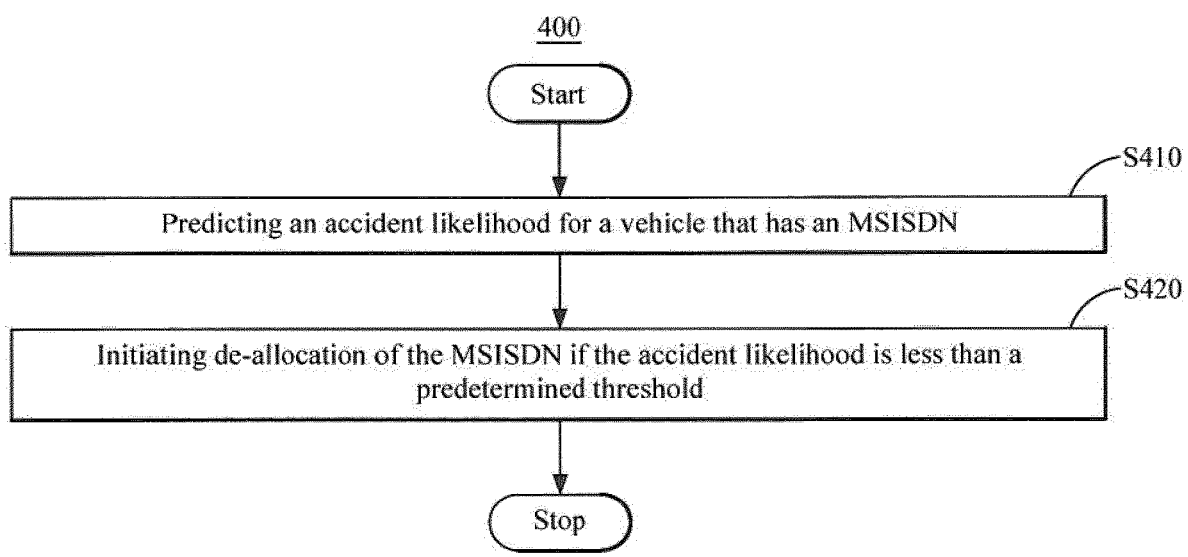
FIG. 4 is a flowchart of a method for de-allocating an MSISDN according to an embodiment.

FIG. 4 illustrates a flowchart of a method 400 for de-allocating an MSISDN. The steps of method 400 may be executed after the steps of method 300. Method 400 includes predicting the accident likelihood for the vehicle that has an MSISDN at S410 and initiating de-allocation of the MSISDN if the accident likelihood is less than a second predetermined threshold at S420. Step S420 may include prompting removal of the link between the MSISDN and the vehicle's IMSI from the network database (e.g., from HLR), and triggering the MSISDN to be added to the pool of available MSISDNs.

Figure 5:
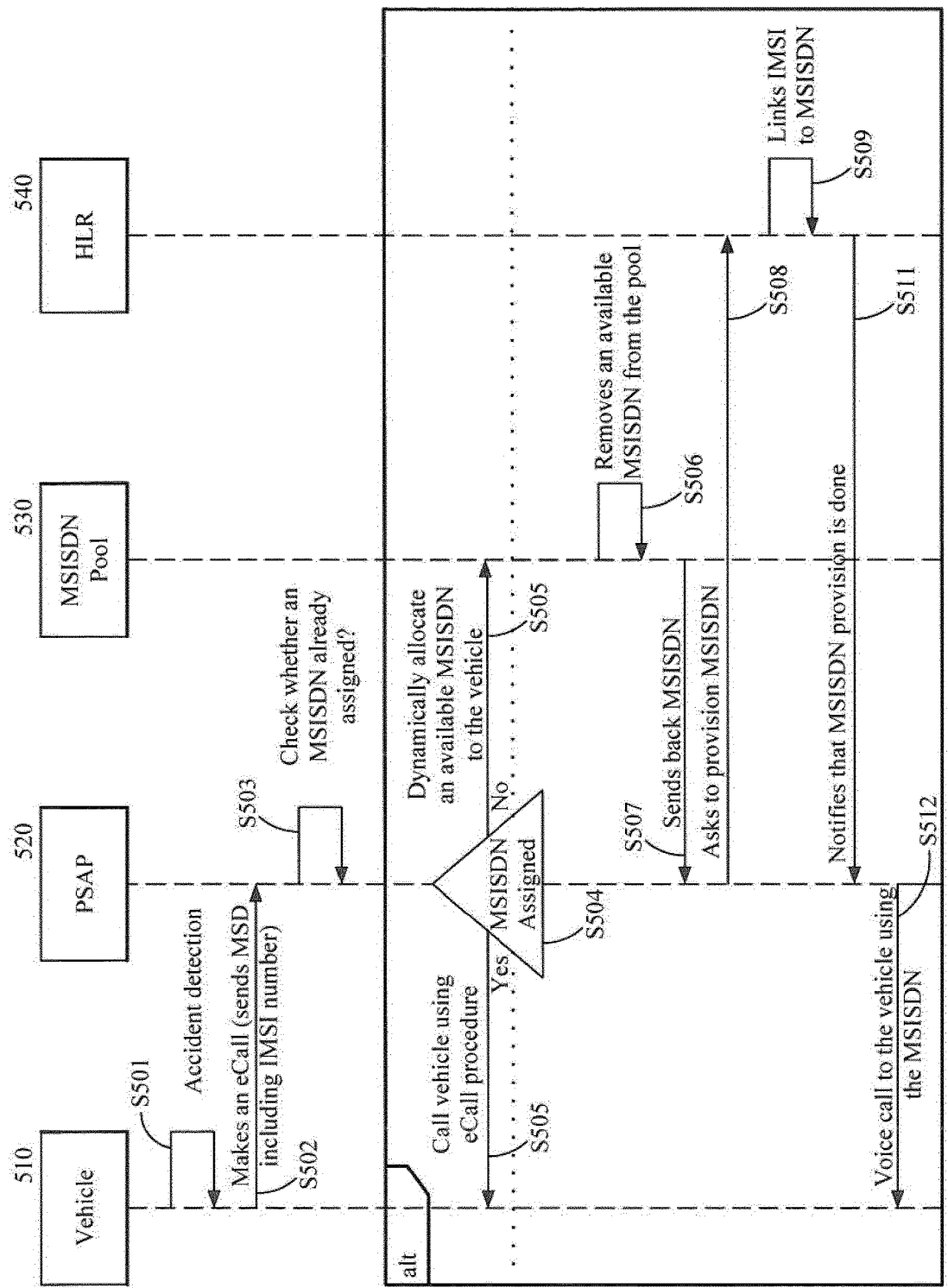
FIG. 5 illustrates communications in an LTE network for allocating an MSISDN to a vehicle in an accident, according to an embodiment.

The above-described embodiments include providing an MSISDN before an accident occurs. However, one can easily foresee a situation in which a vehicle without an MSISDN assigned is in an accident. FIG. 5 illustrates communications in an LTE network for allocating an MSISDN to a vehicle in an accident, according to an embodiment. At S501, a vehicle 510 detects that it has been involved in an accident. That is, a controller connected to the vehicle's sensors identifies an accident situation. Then, the vehicle makes an eCall to a PSAP 520 conveying the vehicle's position, and MSD occurs without involving the wireless network, at S502. PSAP 520 then checks whether an MSISDN is currently assigned to the vehicle at S503. If the vehicle has an MSISDN (i.e., YES branch of S504), then PSAP 520 makes a voice call to the vehicle at S505. However, if the vehicle does not have an MSISDN (i.e., NO branch of S504), then PSAP 520 triggers allocation of an MSISDN to the vehicle. In the embodiment illustrated in FIG. 5, triggering MSISDN allocation includes asking MSISDN pool 530 to indicate an MSISDN be allocated to the vehicle at S505. At S506, MSISDN pool 530 removes the MSISDN to be allocated from the pool of available MSISDNs, and sends this MSISDN to PSAP 520. Further, at S508, PSAP 520 sends the vehicle's IMSI and the MSISDN to HLR 540, asking to be linked, which HLR 540 does at S509. HLR 540 notifies PSAP 520 when the link is completed, at S511, thereby enabling PSAP 520 to make a voice call to vehicle 510 using the MSISDN at S512.

Figure 6:
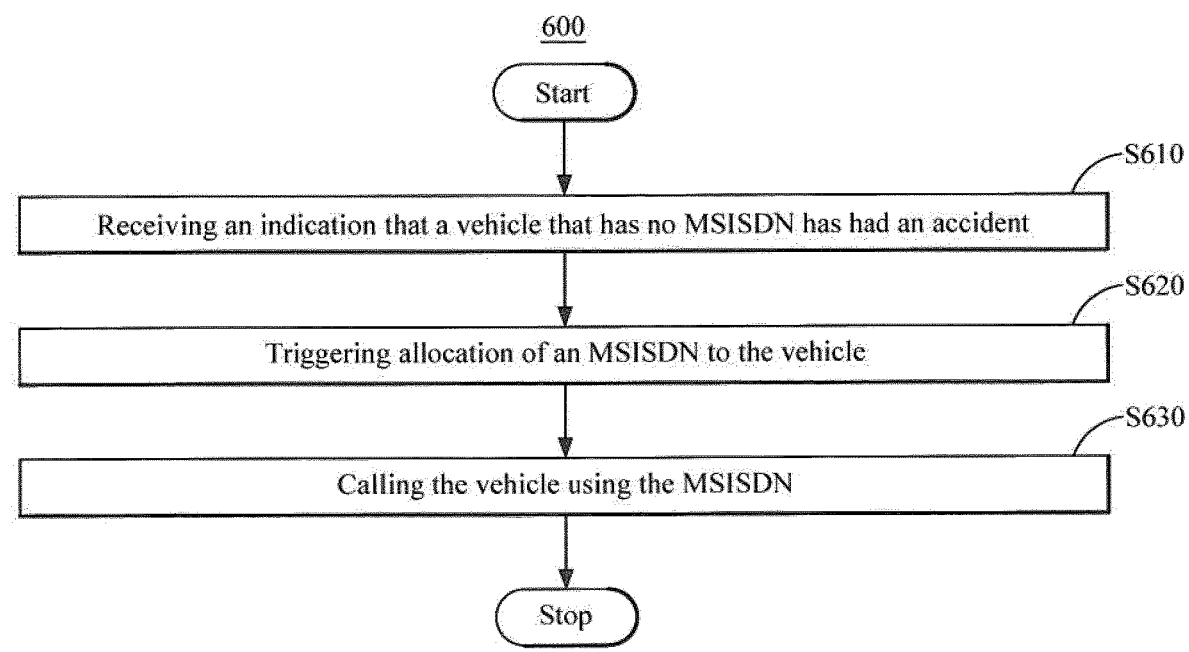
FIG. 6 is a flowchart of a method for allocating an MSISDN to a vehicle in an accident according to another embodiment.

FIG. 6 is a flowchart of a method 600 performed by an emergency assistance network device for providing an MSISDN to a vehicle in an accident, according to an embodiment. Method 600 includes receiving an eCall indicating that a vehicle without an MSISDN allocated has had an accident, at S610. Method 600 then includes triggering allocation of an MSISDN to the vehicle, at S620, and calling the vehicle using the MSISDN at S630. As mentioned in the embodiment described relative to FIG. 5, the step of triggering allocation of the MSISDN to the vehicle may include obtaining the MSISDN from a pool of available MSISDNs and prompting storing of a link between the MSISDN and the vehicle's IMSI in the wireless network. After a while, when an accident emergency situation ends, the MSISDN may be de-allocated as described relative to FIG. 4 (i.e., prompting removal of the link between the MSISDN and the vehicle's IMSI, and indicating that the MSISDN has become available to a pool of MSISDNs).

It is foreseeable a situation in which a vehicle having non-cellular Internet connectivity (e.g., WiFi, Dedicated Short Range Communication—DSRC, BlueTooth, WiFi or USB tethered from a smart phone, etc.) but not an IMSI and neither an MSISDN. In this case a temporary IMSI may be provided to the vehicle in association with the vehicle's identification number, VIN, which is unique. The vehicle may download a virtual SIM profile that intermediates the vehicle's connection to the wireless network without the physical SIM card. Thus, the SIM functionality is a soft SIM profile that provides an IMSI. For example, in a context similar to the one illustrated in FIG. 2, the vehicle sends its MSD and VIN to the network device executing the prediction function. Upon determining that the likelihood for this vehicle to be in an accident is higher than a predetermined threshold, the network prompts the vehicle to download a virtual SIM card over the Internet connection. Then, once acquiring the vehicle's IMSI, the network device causes an MSISDN be associated with the vehicle's IMSI in the previously described manner.

Figure 7:
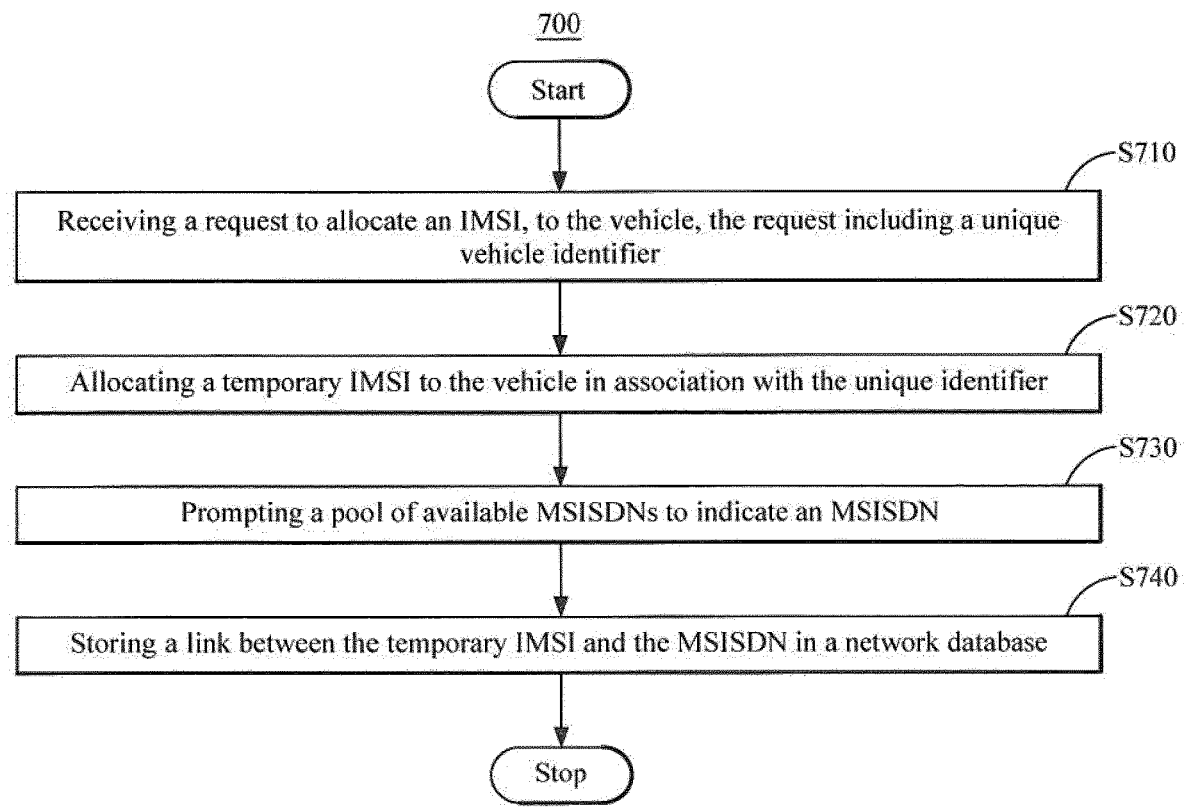
FIG. 7 is a flowchart of a method for enabling communication with a vehicle connected to Internet but initially having no IMSI or MSISDN, according to yet another embodiment.

FIG. 7 is a flowchart of a method 700 for enabling communication with a vehicle connected to Internet initially having no IMSI or MSISDN, according to an embodiment. Method 700 includes receiving a request to allocate an international mobile subscriber identity, IMSI, to the vehicle, the request including a unique vehicle identifier (e.g., VIN), and allocating a temporary IMSI to the vehicle in association with the unique identifier. Method 700 further includes prompting (S730) a pool of available MSISDNs to indicate an MSISDN at S730, and storing a link between the temporary IMSI and the MSISDN in a network database, at S740. Once the vehicle has connectivity a new IMSI may be provided by downloading a new virtual SIM card.

Figure 8:
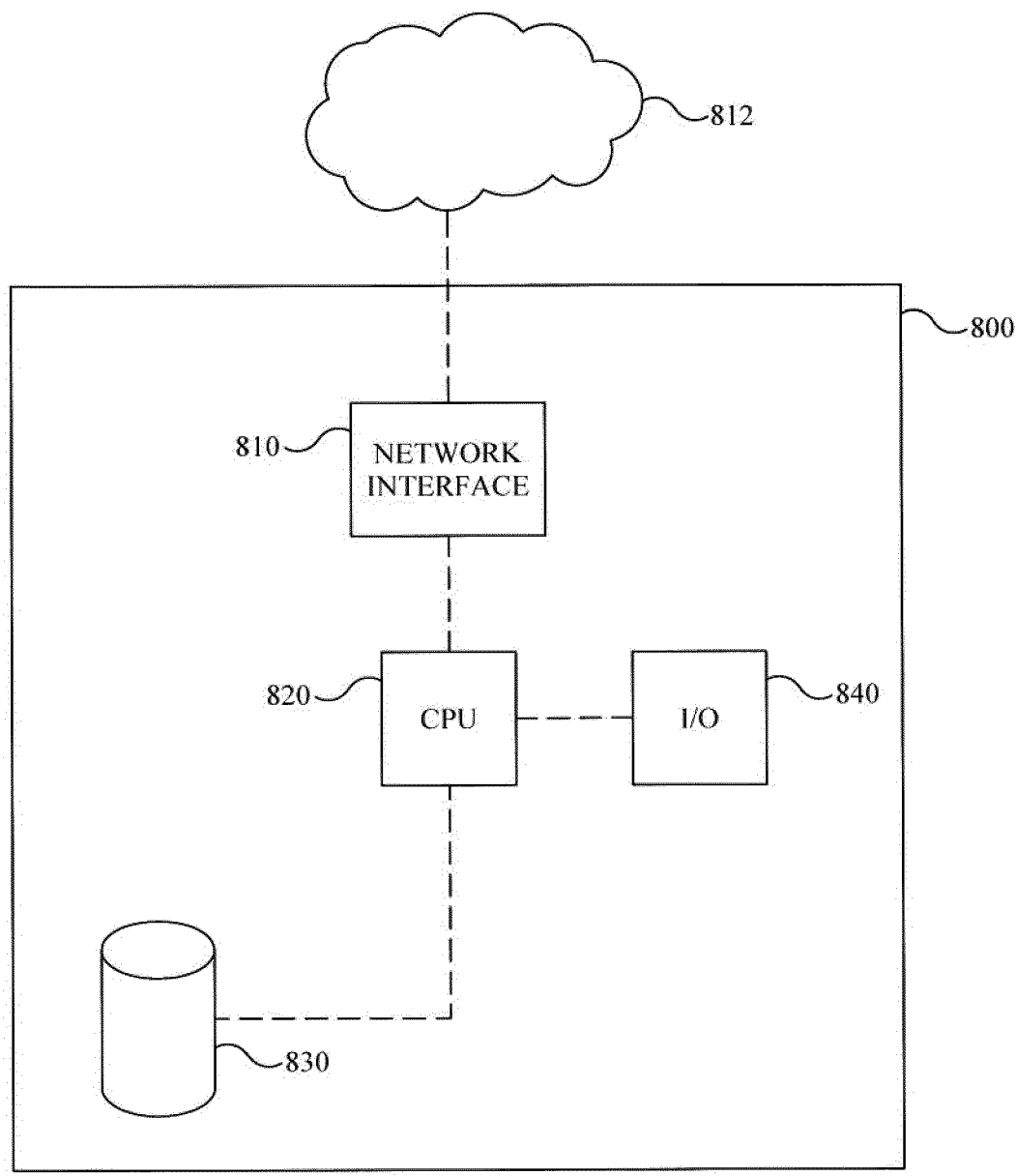
FIG. 8 is a block diagram of a network device according to an embodiment.

FIG. 8 illustrates a network device 800 able to perform as a prediction service or as a PSAP. The network device is connected and communicates with other devices in cloud 812 and with vehicles. Network device 800 has a network interface 810 configured to enable communication with other devices, and a central processing unit (CPU) 820 including one or more processors. Network device 800 may also include a memory 830 and an operator interface 840. Memory 830 may store executable codes which, when executed by a processor, make the processor perform the methods described in this section.

A network device having a structure similar to network device 800 may be configured to selectively enable allocating/de-allocating an MSISDN to/from a vehicle, with its CPU being configured to control the communication interface to obtain the vehicle's IMSI and other data related to the moving vehicle (e.g., vehicle's location, time and motion direction) to which no MSISDN is allocated, to predict accident likelihood for the moving vehicle, and to control the communication interface to send first messages causing an MSISDN to be allocated to the moving vehicle, if the accident likelihood exceeds a first predetermined threshold. The CPU may predict accident likelihood based on one or more of driver's behavior, traffic, weather and road conditions. The CPU may also control the communication interface to communicate with a database and check that the moving vehicle has no MSISDN allocated. First messages may include a message prompting a pool of available MSISDNs to indicate the MSISDN, and a message triggering a link between the IMSI and the MSISDN to be stored. Alternatively or additionally, the first messages may include a message for conveying the MSISDN to the moving vehicle.

The CPU may further be configured to predict the accident likelihood for the vehicle that has the MSISDN, and to control the communication interface to send second messages causing de-allocation of the MSISDN if the accident likelihood for the vehicle having the MSISDN is less than a second predetermined threshold. The second messages include a message prompting removal of the link between the MSISDN and the vehicle's IMSI from a network database, and a message causing the MSISDN to be added to the pool of available MSISDNs.

An emergency assistance network device having a structure similar to network device 800 may be configured to handle eCalls. When the communication interface receives an eCall indicating that a vehicle with no MSISDN has had an accident, the CPU controls the communication interface to send messages triggering allocation of an MSISDN to the vehicle in a wireless communication network, and to initiate a call to the vehicle using the MSISDN. The messages may include a message for obtaining the MSISDN from a pool of available MSISDNs, and a message prompting a link between the MSISDN and the vehicle's IMSI to be stored in the wireless communication network. The CPU may also control the communication interface to send messages causing de-allocation of the MSISDN from the vehicle when an emergency situation related to the accident ends.

According to yet another embodiment a network device having a structure similar to network device 800 may be configured to enable a vehicle connected to Internet to make an eCall. The communication interface of such an embodiment is configured to receive a request to allocate an international mobile subscriber identity, IMSI, to the vehicle, the request including a unique vehicle identifier. The processing unit is configured to control the communication interface to send messages triggering a temporary IMSI to the vehicle associated with the unique identifier be allocated to the vehicle, a pool of available MSISDNs to indicate an MSISDN, and a link between the temporary IMSI and the MSISDN be stored in a network database.

Figure 9:
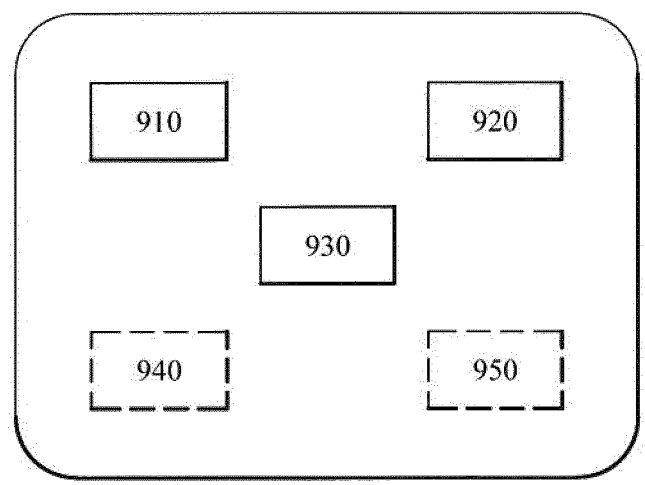
FIG. 9 is a block diagram of a device for allocating/de-allocating an MSISDN according to an embodiment.

According to yet other embodiments, network devices may include software or hardware modules configured to enable communication via a wireless network with moving vehicles, depending on the likelihood or presence of an emergency situation. Thus, FIG. 9 illustrates a computer program 900 that includes modules causing a network device to perform steps of the method 300. Computer program 900, which may be stored on a non-transitory computer readable medium such as memory 830, includes:

a first module 910 whose execution causes the network device to obtain an IMSI and data related to a moving vehicle to which no MSISDN is allocated, a second module 920 whose execution causes the network device to predict an accident likelihood for the moving vehicle, and a third module 930 whose execution causes the network device to trigger an MSISDN to be allocated to the moving vehicle, if the accident likelihood exceeds a first predetermined threshold.

Computer program 900 may also include a fourth module 940 whose execution causes the network device to predict the accident likelihood for the vehicle that has the MSISDN, and a fifth module 950 whose execution causes the network device to initiate de-allocation of the MSISDN if the accident likelihood is less than a second predetermined threshold.

Figure 10:
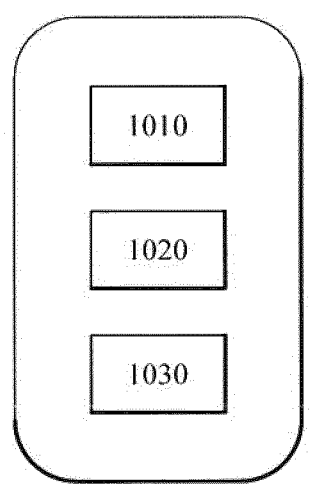
FIG. 10 is a block diagram of a network device for allocating an MSISDN to a vehicle in an accident.

FIG. 10 illustrates a computer program 1000 that includes modules causing a network device to perform steps of the method 600. Computer program 1000, which may be stored on a non-transitory computer readable medium such as memory 830, includes:

a first module 1010 whose execution causes the network device to receive an eCall indicating that a vehicle that has no MSISDN has had an accident, a second module 1020 whose execution causes the network device to trigger allocation of an MSISDN to the vehicle, and a third module 1030 whose execution causes the network device to call the vehicle using the MSISDN.

Figure 11:
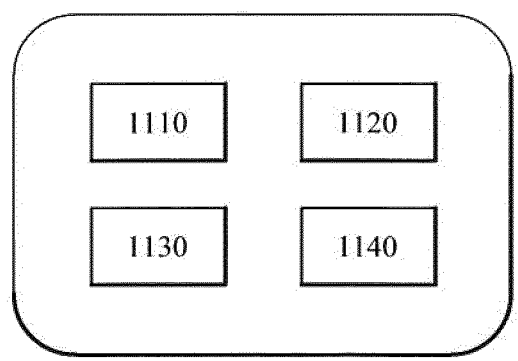
FIG. 11 is a block diagram of a network device for enabling communication with a vehicle connected to Internet but initially having no IMSI or MSISDN, according to yet another embodiment

FIG. 11 illustrates a computer program 1100 that includes modules causing a network device to perform steps of the method 700. Computer program 1100, which may be stored on a non-transitory computer readable medium such as memory 830, includes:

a first module 1110 whose execution causes the network device to receive a request to allocate an international mobile subscriber identity, IMSI, to the vehicle, the request including an unique vehicle identifier, a second module 1120 whose execution causes the network device to allocate a temporary IMSI to the vehicle, based on the unique identifier, a third module 1130 whose execution causes the network device to prompt a pool of available MSISDNs to indicate an MSISDN, and a fourth module 1140 whose execution causes the network device to cause storing of a link between the temporary IMSI and the MSISDN in a network database.

The embodiments disclosed in this section provide methods and network devices that are able to trigger an MSISDN dynamic provision. These embodiments have the advantage of economy of MSISDNs, which is a limited and costly resource. Additionally, no additional hardware is necessary to implement these methods. It should be understood that this description is not intended to limit the invention. On the contrary, the exemplary embodiments are intended to cover alternatives, modifications and equivalents, which are included in the scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor. This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for dynamically allocating/de-allocating a Mobile Station International Subscriber Directory Number (MSISDN) in a wireless communication network, the method comprising:
    obtaining an international mobile subscriber identity (IMSI) related to a moving vehicle to which no MSISDN is allocated;
    predicting an accident likelihood for the moving vehicle;
    determining whether the accident likelihood for the moving vehicle exceeds a first predetermined threshold; and
    causing an MSISDN to be allocated to the moving vehicle as a result of determining that the accident likelihood exceeds the first predetermined threshold.

2. The method of claim 1, wherein the accident likelihood is predicted based on one or more of a driver's behavior, detected traffic conditions, weather, and road conditions.

3. The method of claim 1, wherein the obtaining includes checking that the moving vehicle has no MSISDN allocated.

4. The method of claim 1, further comprising receiving data related to the moving vehicle, wherein the data related to the moving vehicle includes data indicating the vehicle's location and data indicating a direction in which the vehicle is traveling.

5. The method of claim 1, wherein the causing of the MSISDN to be allocated includes prompting a pool of available MSISDNs to indicate the MSISDN, and a link between the IMSI and the MSISDN to be stored in a network database.

6. The method of claim 1, further comprising conveying the MSISDN to the moving vehicle.

7. The method of claim 1, further comprising:
    predicting the accident likelihood for the vehicle that has the MSISDN; and
    initiating de-allocation of the MSISDN if the accident likelihood is less than a second predetermined threshold.

8. The method of claim 7, wherein the initiating includes prompting removal of the link between the MSISDN and the IMSI of the vehicle from the network database; and triggering the MSISDN to be added to the pool of available MSISDNs.

9. A network device configured to selectively enable allocating/de-allocating of a Mobile Station International Subscriber Directory Number (MSISDN) to/from a vehicle, the network device comprising:
    a communication interface; and
    one or more processors connected to the communication interface and configured to:
        control the communication interface to obtain an international mobile subscriber identity (IMSI) related to a moving vehicle to which no MSISDN is allocated,
        predict an accident likelihood for the moving vehicle, and
        control the communication interface to send first messages causing an MSISDN to be allocated to the moving vehicle, if the accident likelihood exceeds a first predetermined threshold.

10. The network device of claim 9, wherein the network device predicts the accident likelihood based on one or more of driver's behavior, traffic, weather and road conditions.

11. The network device of claim 9, wherein the network device further controls the communication interface to communicate with a database for checking that the moving vehicle has no MSISDN allocated.

12. The network device of claim 9, wherein the network device is configured to obtain data related to the moving vehicle, and the data related to the moving vehicle includes vehicle's location, time and motion direction.

13. The network device of claim 9, wherein the first messages include a message prompting a pool of available MSISDNs to indicate the MSISDN, and a message triggering a link between the IMSI and the MSISDN to be stored.

14. The network device of claim 9, wherein the first messages include a message for conveying the MSISDN to the moving vehicle.

15. The network device of claim 9, wherein the network device is further configured to:
    predict the accident likelihood for the vehicle that has the MSISDN; and
    control the communication interface to send second messages causing de-allocation of the MSISDN if the accident likelihood for the vehicle that has the MSISDN is less than a second predetermined threshold.

16. The network device of claim 15, the second messages include a message prompting removal of the link between the MSISDN and the IMSI of the vehicle from a network database, and a message causing the MSISDN to be added to the pool of available MSISDNs.

* * * * *